Feb. 21, 1967 R. L. NELSON 3,305,831
INEQUALITY COMPARISON CIRCUIT
Filed April 22, 1964
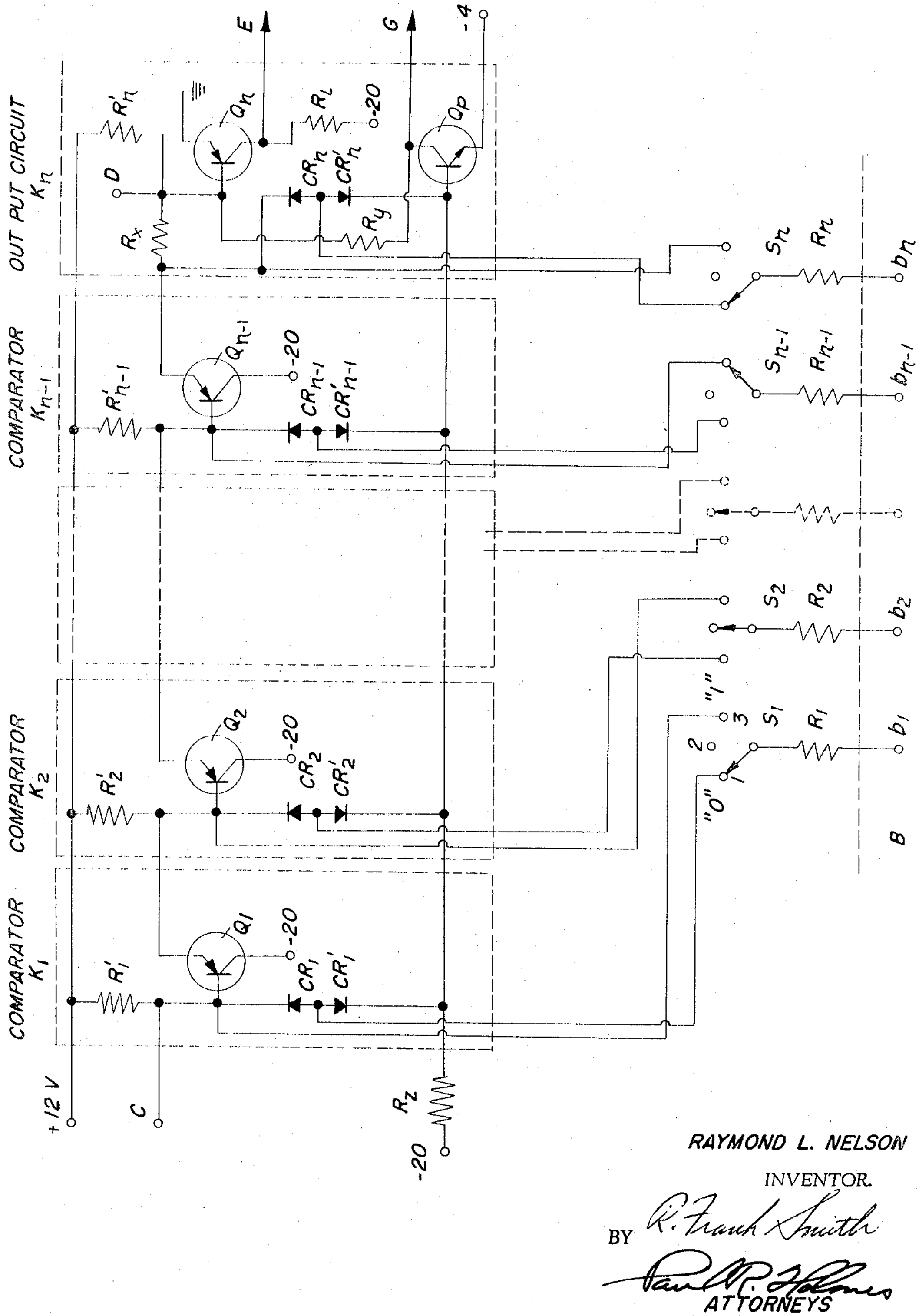
RAYMOND L. NELSON
INVENTOR.
BY R. Frank Smith
Paul R. Holmes
ATTORNEYS

United States Patent Office 3,305,831

Patented Feb. 21, 1967

3,305,831

INEQUALITY COMPARISON CIRCUIT

Raymond L. Nelson, Rochester, N.Y., assignor to Eastman Kodak Company, Rochester, N.Y., a corporation of New Jersey Filed Apr. 22, 1964, Ser. No. 361,769
3 Claims. (Cl. 340—146.2)

My invention relates generally to a system for comparing numbers, and more particularly to a method and apparatus for comparing the relative magnitudes of two electrically encoded binary numbers.

Classification and storage of large volumes of information has necessitated the changing of alphabetical, numerical, and chronological data into convenient code forms. One such form is the binary code whose digits of "1" and "0" may be represented by distinct voltage levels.

It is desirable to produce circuitry which, when used in conjunction with information handling machines, will rapidly select any desired digital number or numbers during a scanning process. For example, it is sometimes desired to select from chronologically coded microfilmed documents, all those documents issued on, before, or after a certain date.

Heretofore, relay circuitry and complicated electronic systems involving AND–OR gates have been employed to compare the relative magnitudes of binary numbers. One disadvantage of the relay operated device is its inability to provide distinct output levels which instantaneously indicate if two changing binary numbers are equal; or if not equal, which is the larger. They are also cumbersome and involve much wiring. Electronic circuitry which performs the desired function is usually comprised of succeeding stages of AND–OR circuitry, the number of stages depending upon the number of digits in the encoded number. Such a network becomes complex and expensive to build and maintain. Expense and lack of flexibility in handling different size binary numbers are other basic disadvantages of the prior art devices.

An object of this invention is to provide a novel device for comparing quantities expressed in binary form.

Another object is to provide a simple, accurate, and reliable device for determing at any moment the magnitudinal relationship of one digital quantity with respect to another while both quantities remain constant, or while one or both quantities are varying.

A further object is to provide a device which is economical to build and maintain and sufficiently flexible to handle different size binary numbers and providing as a further feature the selection of any combination of digits for comparison.

Other objects and advantages of the invention will be apparent during the course of the following description given with relation to the accompanying drawing in which the sole figure is a schematic circuit diagram of a digital comparator of the present invention, showing the individual comparator circuits and the output circuit thereof.

Referring to the drawing, an apparatus for comparing two binary encoded messages B and S is shown. Each message is composed of N number of digits arranged in sequential order of decreasing significance as $B_1$, $B_2$, . . . $B_{n-1}$, $B_n$ and $S_1$, $S_2$, . . . $S_{n-1}$, $S_n$ respectively. Selection of an "0" or a "1" bit for each of the digits of the message S may be accomplished by placing the corresponding switches $s_1$, $s_2$, . . . $s_{n-1}$, $s_n$ respectively into the desired position 1 corresponding to a "0" and position 3 corresponding to a "1." Position 2 places any digital channel into an inoperative position, whereby the remaining combination of digits may be used for purposes of comparison.

The term "bit" is used to indicate the binary message ("1" or "0") which each digit of the total number contains.

The individual comparator stages of identical construction, $K_1$, $K_2$, . . ., $K_{n-1}$, are arranged in parallel configuration. An output circuit $K_n$ is also shown. The output circuit $K_n$ is so designed that transistor $Q_n$ is biased off by resistor $R_n'$, unless a negative signal of sufficient magnitude to turn it on is introduced at its base through resistors $R_x$ or $R_y$. With $Q_n$ turned off, a signal of approximately −20 volts exists at output E; with $Q_n$ turned on to saturation, a signal of essentially 0 volts exits at E.

A positive voltage introduced at the base of $Q_p$ and of sufficient magnitude to turn it on into saturation, will provide an output at G of approximately −4 volts and will cause sufficient current to pass through $R_y$ to turn transistor $Q_n$ on.

Henceforth, a signal of −20 volts at E shall be referred to as E being ON, and a signal of −4 volts at G shall be referred to as G being ON. The absence of a signal at E and at G will be referred to as an OFF condition. It is, therefore, seen from the preceding operational discussion of the output circuit $K_n$ that when E is ON, G is OFF, and when G is ON, E is OFF.

It may be assumed for purposes of illustration with the particular embodiment shown in the drawing, that for the binary number B, the bits for the digits are represented at the inputs $b_1$, $b_2$, . . . $b_{n-1}$, $b_n$ as signals of −8 volts for an "0" bit and ground [i.e. approximately zero (0) volts] for a "1" bit.

If $B_1$ and $S_1$ are equal (e.g. $b_1$ and $s_1$ both "0"), $CR_1$ and $CR_1'$ remain biased off and therefore $Q_1$ and $Q_p$ remain off. Therefore, $Q_n$ is off and output E is ON. Similarly, if $b_1$ and $s_1$ are both "1", $Q_1$ and $Q_p$ remain off, $Q_n$ is off and E remains ON. The same result would be obtained for any digit $B_1$, $B_2$, . . ., $B_{n-1}$, $B_n$. Therefore, is a condition of equality exists ($B=S$), E is ON and G is OFF.

If $B_1>S_1$ ($b_1$="1", $s_1$="0"), $Q_1$ remains biased off, but $CR_1'$ is turned on due to the grounding of input $b_1$, and current flows through $R_1$ and $CR_1'$. $Q_p$ is turned on, i.e. saturates, and the current through $R_y$ causes $Q_n$ to turn on. Therefore, G is ON and E is OFF.

If $B_1<S_1$ ($b_1$="0," $s_1$="1"), $Q_1$ is turned on due to the presence of −8 volts at its base, and consequently the transistors $Q_2$, . . ., $Q_{n-1}$, and $Q_n$ are turned on. Since $Q_p$ is off, both E and G are OFF.

If $B_2>S_2$ ($b_2$="1", $s_2$="0"), and $B_1=S_1$, G would be ON and E would be OFF, due to $Q_p$ turning on, indicating $B>S$. If, however, conditions changed such that $B_1<S_1$ ($b_1$="0", $s_1$="1"), $Q_1$, $Q_2$, . . ., $Q_{n-1}$ would turn on and a sufficiently negative voltage would exist at the base of each of those transistors to bias $CR_2$, . . ., $CR_{n-1}$, $CR_n$ on, and $CR_2'$, . . ., $CR'_{n-1}$, $CR'_n$, off thereby turning G OFF and leaving E OFF. This would indicate a condition of $B<S$. Similarly, if $$B_2<S_2 \ (b_2=\text{"0,"}\ s_2=\text{"1"})$$

and a $B_1=S_1$ condition changes to a $$B_1>S_1 \ (b_1=\text{"1,"}\ s_1=\text{"0"})$$

G is turned ON, thereby turning E OFF. A condition of $B>S$ would then be indicated.

From the preceding discussion, it is seen that the outputs E and G are affected by the most significant corresponding digits of B and S which are unequal. Thus, if $B_1$ does not equal $S_1$, it matters not what the magnitudinal relationships of the rest of the digits are, since there is an inequality in the most significant digit. Similarly, if $B_1=S_1$, the output would be determined by the next pair of digits which were unequal. Therefore, the magnitudinal relationship of B and S may be determined at any time from the outputs E and G. The following table is included by way of summary:

| | |
|---|---|
| $B>S$ | G is ON, E is OFF |
| $B<S$ | G is OFF, E is OFF |
| $B=S$ | E is ON, G is OFF |

The number of digits in the binary number capable of being compared by the apparatus of the present invention may be altered by adding or subtracting required individual comparator circuits. Furthermore, if the signal from output E is inverted and passed to point C of a second circuit identical to that of the drawing, and if the two G outputs are coupled together in such a manner as to make them always equal and under the control of eath other, a circuit with capacity for twice as many digits would be obtained. An additional modification would be to selectively introduce a positive voltage at D of sufficient magnitude to turn $Q_n$ off and E ON, and thereby create an artificial "equal to" condition. This would permit one to disable the unequal condition without disturbing the quantity B. $Q_p$, however, would have to be held off to prevent the simultaneous generation of E and G signals. Thus, in an application involving the scanning of microfilmed documents, the scanner could be programmed to stop at an "equal to" condition. By applying the positive signal at D and holding $Q_p$ off, the data could be stopped at any point.

It will now be apparent to those skilled in the art that the apparatus of the present invention provides a simple accurate means for comparing quantities expressed in binary form and for indicating the magnitudinal relationship of such quantities.

The invention has been described in considerable detail with particular reference to certain preferred embodiments thereof, but it will be understood that variations and modifications can be effected within the spirit and scope of the invention as described hereinabove, and as defined in the appended claims.

Having now particularly described my invention, what I desire to secure by Letters Patent of the United States and what I claim is:

1. Apparatus for comparing one binary quantity as represented by N number of electrical inputs with a second binary quantity, said apparatus comprising:

(a) a plurality of N–1 number of comparator units electrically connected in parallel configuration for producing output circuit control signals, in response to N–1 number of said electrical inputs applied respectively to said units;

(b) an output circuit for producing output signals indicative of the relative magnitude of the two binary quantities in response to said control signals;

(c) means for applying said control signals to said output circuit; and (d) means for selectively applying said N–1 number of electrical inputs to the N–1 number of comparator units respectively and the Nth of said N number of electrical inputs to said output circuit and comprising;

(1) multi-position switch means for conditioning said comparator units and output circuit to receive electrical inputs corresponding respectively to and representative of said second binary quantity at one of two circuit locations each having a preselected effective activating signal response level so that said control signals drive the output circuit to produce output signals which indicate an equal, greater or less than relation of the two binary quantities, and (2) current limiting impedance means in series with each said multi-position switch means for coupling each digit of the one binary quantity to a corresponding digit of the second binary quantity.

2. Apparatus in accordance with claim 1 and wherein each of said comparator units comprises:

(a) a transistor;

(b) means for electrically biasing said transistor to hold the same in a relatively nonconducting state;

(c) a pair of diodes connected in opposition with the cathode of one connected to the base of said transistor and the cathode of the other to said output circuit; and (d) a means for applying the output of said transistor to the base of the transistor of the adjacent comparator unit; and (e) whereby the overcoming of said biasing means and the resultant conduction of the transistor of any given comparator unit, depends upon the position of the switch means associated with such given comparator unit and the magnitude of the electrical input applied thereto.

3. An apparatus in accordance with claim 2 and wherein said output circuit includes a first circuit and a second circuit, said first circuit comprising:

(a) a first transistor;

(b) means for electrically biasing said first transistor to hold the same in a relatively nonconducting state;

(c) means for applying the output from the last of said comparator units to the base of said first transistor so that said first transistor is driven to saturation upon conduction of any one or more of said comparator units;

and said second circuit comprises:

(d) a second transistor;

(e) means for electrically biasing said second transistor to hold the same in a relatively nonconducting state;

(f) a pair of diodes connected in opposition with the cathode of one connected to the base of said second transistor and the cathode of the other to the base of said first transistor;

(g) means for applying the output circuit connection from the cathodes of said other diodes in said comparator units, to the base of said second transistor, and;

(h) means for applying the output of said second transistor to the base of said first transistor so that the first transistor is driven to saturation upon conduction of said second transistor;

and wherein said conditioning switch means further comprises:

(i) circuit switch means for selectively applying said Nth electrical input to the base of said first transistor, or between said diodes of the output circuit;

whereby the output signals of said output circuit, as determined by the state of conduction of said first and second transistor, are responsive to the position of said switch means and magnitude of the electrical inputs which are applied to the comparator units and output circuit through said switch means.

References Cited by the Examiner

UNITED STATES PATENTS

| | | | |
|---|---|---|---|
| 2,885,655 | 5/1959 | Smoliar | 235—177 |

MALCOLM A. MORRISON, *Primary Examiner.*

ROBERT C. BAILEY, *Examiner.*

I. FAIBISCH, M. J. SPIVAK, *Assistant Examiners.*